J. C. MORGAN.
SPRING MOTOR.
APPLICATION FILED AUG. 7, 1915.

1,219,340.

Patented Mar. 13, 1917.
2 SHEETS—SHEET 1.

Witnesses
C. F. Rudolph
D. W. Gould

Inventor
J. C. Morgan,
By Victor J. Evans
Attorney

J. C. MORGAN.
SPRING MOTOR.
APPLICATION FILED AUG. 7, 1915.
1,219,340.
Patented Mar. 13, 1917.
2 SHEETS—SHEET 2.
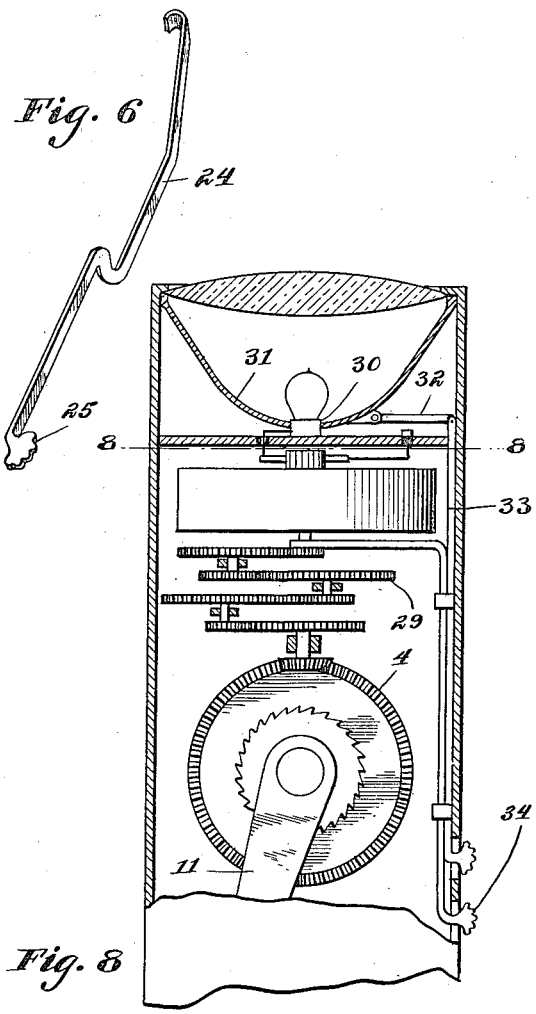
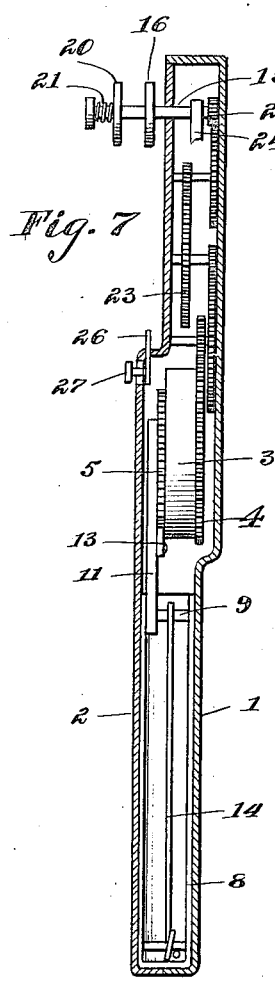
Witnesses
C. F. Rudolph
D. W. Gould
Inventor
J. C. Morgan,
By Victor J. Evans
Attorney

UNITED STATES PATENT OFFICE.

JOHN C. MORGAN, OF LOS ANGELES, CALIFORNIA.

SPRING-MOTOR.

1,219,340.     Specification of Letters Patent.     Patented Mar. 13, 1917.

Application filed August 7, 1915. Serial No. 44,189.

*To all whom it may concern:*

Be it known that I, JOHN C. MORGAN, a citizen of the United States, residing at Los Angeles, in the county of Los Angeles and State of California, have invented new and useful Improvements in Spring-Motors, of which the following is a specification.

The invention relates to a portable and mechanical structure designed primarily for use as a hand device and involving a means whereby a spring motor may be readily and conveniently rewound and the power thereof utilized particularly for the purposes of driving fan blades or for operating a generator to produce current for light purposes to provide a flash light.

In its essential feature the invention comprises a comparatively small case in which is arranged a spring motor which through suitable gearing may be utilized to operate a fan of particular structure or a generator for generating current, the case being in part provided with a movable section adapted to be readily and conveniently actuated by hand to rewind or periodically wind the spring motor.

The invention in the preferred form of details will be described in the following specification, reference being had particularly to the accompanying drawings, in which:

Figs. 4, 5 and 6 are perspective details of the structure;

Fig. 7 is a section taken at right angles to Fig. 3;

Fig. 8 is a broken vertical section showing the device in use as a flash light.

Figure 1:
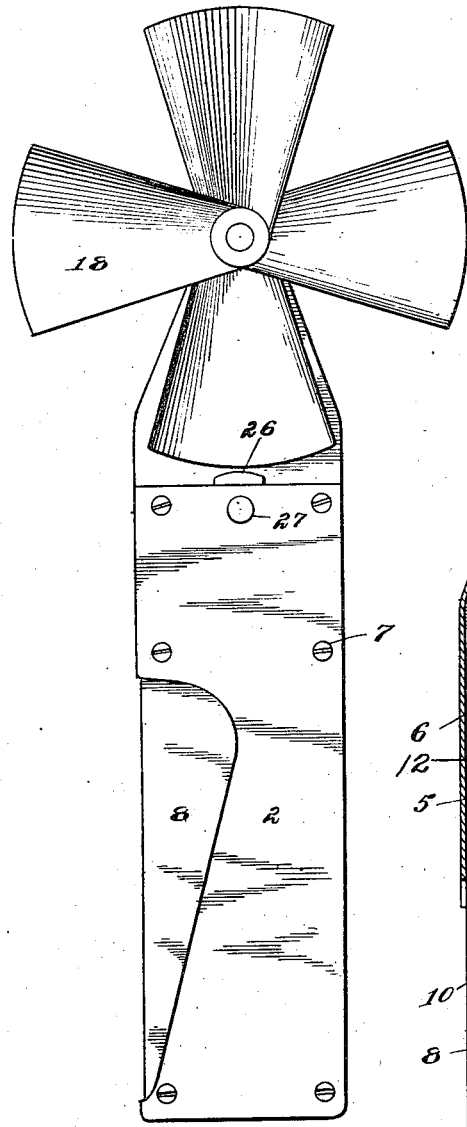
Figure 1 is an elevation of the improved mechanical power device showing the same designed for use as a fan.

Referring particularly to those figures of the drawing wherein the device is designed for use as a fan the improved mechanical power device comprises a casing made in two sections, 1 and 2, the section 2 acting as a cover and forming merely a cover plate for the upper half of the casing while at the lower half it forms practically one-half the case. The case is of elongated form preferably gradually reduced toward the upper end for a portion of the length to present a pointed end. Arranged within the case at a point about centrally of the length thereof is a spring motor 3, which may be of any desired type and which includes a driving gear 4 operated by the spring and a winding ratchet wheel 5 by which the spring may be wound. The main section 1 of the case is provided with studs 6 interiorly threaded to receive screws 7 whereby the sections of the case may be secured together. In the lower portion of the case, or that portion wherein the cover plate forms one-half the thickness of the case, one end wall and opposing side walls are cut away as shown, and in this cut away portion is mounted an operating section 8. The section 8 in effect is so shaped and of such size as when in normal position to complete the outline of the case, being exactly, however, of somewhat less dimensions so that it may be moved within the case for desired operation. The operating member is pivotally mounted upon one of the securing studs at the lower end of the case and at the upper end is provided with a transverse pin 9 connected in the side walls. On this pin through the medium of a slot 10 is mounted a winding member comprising an arm 11 formed at the forward end with an opening 12 to engage the arbor of the spring motor and provided at its under side with a spring held pawl 13 to engage the winding ratchet wheel 5. A spring 14 is arranged to normally hold the operating member at its outward limit of movement that is, in the position where it is in effect a completion of the case.

Figure 2:
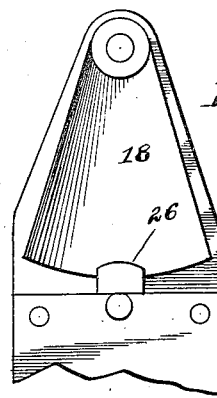
Fig. 2 is a broken view of the same showing the fan blades in closed relation.
Figure 3:
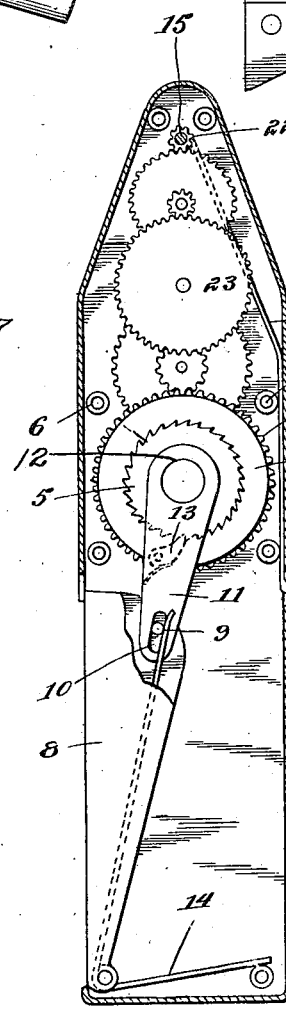
Fig. 3 is a vertical central section of Fig. 1.
Figure 4:
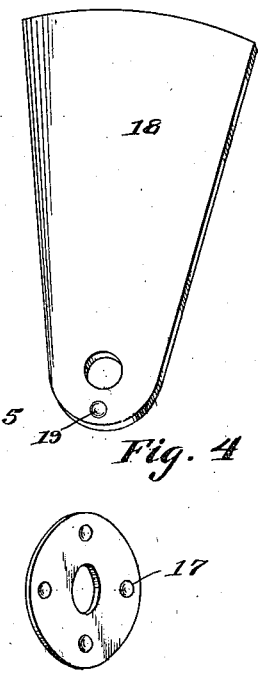
Figure 5:
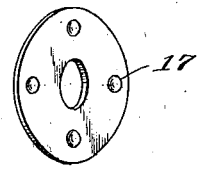

Mounted in the upper or pointed end of the case is an operating shaft 15 which beyond the cover of the case is provided with a fixed disk 16 formed with a series of notches 17. Rotatably mounted upon the shaft 15 are fan blades 18, these blades being formed with projections 19 adapted to seat in the notches 17 of the disk so that the blades may be spread into a fan forming relation or brought together in superimposed relation as shown in Fig. 2. A washer 20 is arranged upon the shaft above the blades and held by a spring 21 to exert such pressure upon the blades as will secure them in their desired positions against accidental displacement.

Within the case the shaft 15 is provided with a gear 22, and between said gear and the drive gear 4 of the spring motor is arranged any desired system of gearing 23 to impart an extremely rapid movement to the shaft 15 in the operation of the spring motor.

A brake member 24 is arranged within the case, the upper end of which is formed to embrace the shaft 15 and the lower end projects through an opening in the case in the form of a button or head 25. This brake member may be operated to hold the shaft against movement or free the same, thereby placing within the control of the user the desired operation of the structure.

As a means for holding the fan blades in inoperative position I secure in the central portion of the case which is offset as shown a slide member 26 operated by a button 27 projecting through the case. In upward or operative position this member is provided in spaced parallel relation to the cover of the case, and when the same is not desired for use the blades are moved into superimposed relation and their ends passed beneath the slide member, where they are held in line with the case and against accidental displacement.

From the above description the operation of the device will be understood. With the parts arranged for operation the spring motor may be wound or kept in a sufficiently wound condition to actuate the parts by operation of the member 8, the movement of the fan being controlled by the brake member, so that the user is thus provided with a small convenient portable fan which may be held in the hand and brought into use for any fan purpose at any time and under practically any circumstances.

In Figs. 8 and 9, as shown, the device is adapted for use as a flash light. Under these circumstances I arrange in the upper portion of the case any suitable type of generator and connect the same through gearing 29 with the drive gear 4 of the spring motor. The circuit from the generator includes a socket 30 arranged at the base of a reflector 31 which latter is set within the case, as shown. The circuit includes a switch 32 controlled through a suitable rod and connections 33 from the outside of the case. A brake member 34 practically similar to that previously described is arranged for coöperation with the generator shaft.

In this construction it will be apparent that the motor may be kept readily wound to a condition to operate the generator for generating current or the like, the switch member controlling the period of use of the light proper while the brake member will of course control the operation of the generator while the light is not desired.

What is claimed is:

1. A mechanical power generator including a case having a pivoted section, a spring motor mounted therein, an element to be actuated by the spring motor, winding mechanism for the spring motor including an arm and a loose connection between the arm and pivoted section of the case, whereby in the movement of the pivoted section, the arm is operated to wind the motor.

2. A mechanical power generator including a case having a pivoted section, a spring motor mounted therein, an element to be actuated by the spring motor, winding mechanism for the spring motor including an arm and a loose connection between the arm and pivoted section of the case, whereby in the movement of the pivoted section, the arm is operated to wind the motor, and a spring normally holding the pivoted section of the case in case completing relation.

3. A case of an outline form to be held in the hand, said case including a section pivotally mounted with relation to the case and adapted to be moved inwardly on compression of the hand about the case, a spring for returning the section to normal position, a motor within the case, and a winding mechanism for the motor including an arm having movable connection with the pivoted case section.

In testimony whereof I affix my signature in presence of two witnesses.

JOHN C. MORGAN.

Witnesses:
C. F. KLEINWACHTER,
A. VERDUGO.